Aug. 13, 1940.    K. C. D. HICKMAN    2,210,927
VACUUM DISTILLATION PROCESS
Filed Sept. 5, 1936    2 Sheets-Sheet 1

Kenneth C.D. Hickman
INVENTOR.
BY
ATTORNEYS

Aug. 13, 1940.　　　K. C. D. HICKMAN　　　2,210,927
VACUUM DISTILLATION PROCESS
Filed Sept. 5, 1936　　2 Sheets-Sheet 2

Kenneth C. D. Hickman
INVENTOR.

BY Newton M. Perrins
Warren N. Cannon
ATTORNEYS

Patented Aug. 13, 1940

2,210,927

UNITED STATES PATENT OFFICE 2,210,927

VACUUM DISTILLATION PROCESS

Kenneth C. D. Hickman, Rochester, N. Y., assignor, by mesne assignments, to Distillation Products, Inc., Rochester, N. Y., a corporation of Delaware Application September 5, 1936, Serial No. 99,632
In Great Britain July 6, 1936

7 Claims. (Cl. 202—52)

This invention relates to the high vacuum distillation of relatively non-volatile heat labile organic compounds.

It is well known that when thermally unstable phlegmatic organic compounds are subjected to distillation, much harmful decomposition takes place. The spoiling is caused by heat and the quantity decomposed is dependent both on the temperature and on the length of time the material is exposed to the high temperature. In order to minimize decomposition, it has been customary to reduce the pressure at which distillation takes place or to reduce the mass of material held in the heated zone. This has been done by admitting the material in small quantities at a time to boilers heated under vacuum and withdrawing the material immediately after treatment. The method of operation has reached a natural limit in molecular distillation apparatus where the material is spread in a thin film over a hot surface and the constituents are allowed to evaporate into a space substantially empty of residual gas. The temperature for a given rate of distillation per unit area of surface exposed is thus reduced to the lowest possible limit and the quantity of material exposed to this material in unit time is likewise made small.

The means hitherto employed for exposing the labile material in a thin layer during distillation is by gravitational flow and the layer is thinnest when the flow occurs over smooth vertical surfaces. It has been assumed and so stated in the patent and other literature that such layers range from one-hundredth of an inch to as little as one-thousandth of an inch in thickness. In the course of my researches, however, I have found that difficultly volatile material, such as animal and vegetable oils, and extracts containing hormones, vitamins, and the like, are generally viscous in consistency and do not in actual fact flow by gravitation over these vertical surfaces in films as thin as described. It is possible to obtain extremely thin films by supplying the oil so slowly that the surfaces remain in a nearly drained condition, but in this case the passage of the material is so slow that the time of travel through the still is even greater than taken by the thicker films required for industrial molecular distillation at reasonable speeds. Measurements have been made for such representative oils as cod liver, cottonseed, soya bean, castor, and the like, at temperatures ranging from 20° to 300° C. and it has been found that with reasonable rates of flow the film has a thickness in the neighborhood of .025 inch. For films of such thickness the time of travel over a vertical surface is of the order of an inch per second. Thus a material which will tolerate the temperature of distillation relatively unharmed for six seconds may be purified in a molecular still of laboratory size where the heating column is only six inches high, because the passage through the still occupies only six seconds. When the same oil is subjected to treatment in an industrial unit where the column is perhaps ten feet high, the time of passage is increased twentyfold, decomposition proceeds to a harmful degree, and the distillation ceases to be an economical process. It is true that the rate of flow over the heated surfaces can be accelerated greatly by increasing the rate of supply of the oil, but the thickness of the layer is increased and the unfortunate condition is introduced that the outer layers which are receiving the least supply of heat are traveling the fastest, while the inner layers are maintained hotter for a longer time and are concealed in a position less favorable for evaporation. To counteract this effect, it has been proposed to corrugate the surface, as in my Patent No. 1,942,858 or to employ other means of introducing turbulent flow. All such means, except those contained in the broad class which is now to be described in connection with the present invention, involve, to the best of my knowledge, the use of thicker films and correspondingly greater times of exposure to the harmful temperature of distillation.

It has been proposed in U. S. Patents 27,503; 37,258 and 1,766,699 to affect distribution of a liquid during distillation by application of centrifugal force or by disposition on a rotating drum. However these expedients have never been applied to distillation of unstable phlegmatic liquids under short path high vacuum or molecular distillation. These expedients as disclosed are furthermore of little more value than the gravity flow method disclosed above. In Patent 27,503 the thickness of the film is determined by its viscosity as in the gravity flow method. A similar defect is present in the apparatus of Patent 37,258 and both this patent and 1,766,699 have the defect that the heating is not applied during the filming operation. Another common defect is that decomposition is increased by heating large amounts of the material at a time.

This invention has for its object to provide improved vacuum distillation process and apparatus which will overcome the above difficulties. Another object is to provide an improved high vacuum short path distillation process by which decomposition is greatly reduced. A further object is to provide a method for the high vacuum and especially pseudo molecular and molecular distillation of materials containing fat soluble vitamins by which substantial decomposition can be avoided. A still further object is to provide improved short path vacuum distillation apparatus. Other objects will appear hereinafter.

These objects are accomplished by the hereindescribed invention which comprises disposing the material to be distilled under high vacuum, in such a form or condition that rapid vaporization takes place by means of force greater than, or means other than gravity. Such force by way of example only, is centrifugal force, and such means, by way of example, comprise wiping the material onto rotating plates or drums, or spraying or applying material to traveling bands. Alternatively the material may be sprayed into or subjected in thin layers to the action of hot vapors.

In order to obtain complete distillation before decomposition takes place, or in other words in order to obtain a higher rate of distillation than is possible by gravity flow, I subject the material to the heating influence while in the form of a much thinner film than is possible by gravity flow. I can also increase the rate by the use of expedients which simultaneously cause the surface of the film to be rapidly changed or renewed. Both of these results are obtained by the application of centrifugal force in the manner described below. Other means involve spraying the material, in a state of fine subdivision, into a heated vapor whereby the total evaporating surface is enormously increased. A similar result is also accomplished by disposing the material in the form of a thin film upon the surface of a rotating drum or band, the material being spread on the surface in a much thinner state than is possible by gravity flow.

In order to enable a clearer understanding of the principles of my invention I have illustrated in the accompanying drawings various forms of apparatus in which the process can be carried out.

Referring to the drawings.

Figure 1:
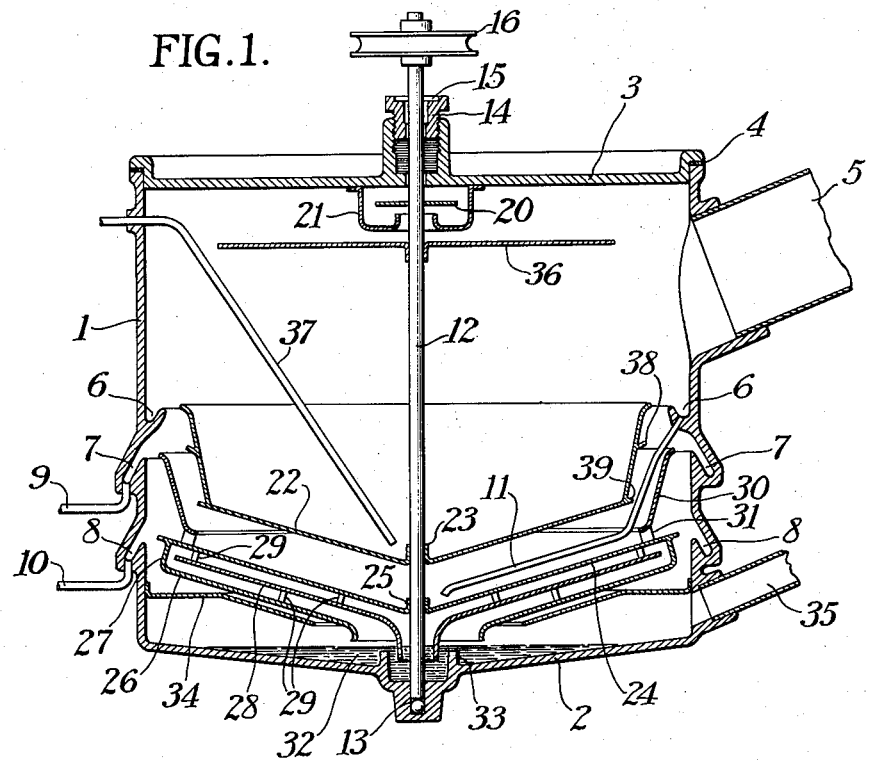
Fig. 1 illustrates a sectional elevation of a centrifugal vacuum still.

Referring to Fig. 1 reference numeral 1 designignates a cylindrical still casing provided with an integral base 2 and a removable top plate 3 which is kept in gas tight contact with the upper edge of 1 by a gasket 4. The wall of casing 1 is provided with a large conduit 5 which connects with high vacuum pumps (not shown). Annular gutters 6, 7 and 8 are formed in the walls of casing 1, gutters 7 and 8 draining into withdrawal conduits 9 and 10 and gutter 6 into conduit 11. A drive shaft 12 provided with a pulley 16 extends the length of the still and is housed in, and supported by bearings 13 and 14 the latter being provided with a packing gland to prevent entry of gas.

The upper portion of bearing 14 is provided with a small reservoir 15 filled with a low vapor pressure liquid which further insures against leakage of gas. Any oil leaking through the bearing falls onto disk 20, fixed on shaft 12 and is thrown by centrifugal force into the annular trough of reservoir 21. A conically-shaped plate 22 is fastened upon shaft 12 at 23, the upper periphery of the plate being on a substantially horizontal line with gutter 6. A conically-shaped plate 24 is fastened to the shaft 12 at 25 and the upper periphery thereof is on a horizontal line with gutter 8. Plate 24 supports a similarly shaped plate 26, the upper curved portion 27 of which is integral with the periphery of plate 24 as shown. A conically-shaped plate 28 positioned substantially equidistant from plates 24 and 26 is supported in the position shown by welded spacers 29. The periphery of plate 28 does not extend to the curved portion 27, so that there is an open passage from the space between plates 24 and 28 and that between plates 26 and 28. A collar-shaped cone 30 is mounted in the position shown upon plate 24 and is rigidly maintained in that position by spacers 31. The upper periphery of plate 30 being opposite to the annular opening of gutter 7. The force of rotation transmitted from shaft 12 to plate 24 is in turn transmitted to plates 28, 26 and 30, and the entire assembly is thereby rotated as a unit. The lower portion of plate 28 dips into a heating fluid 32, the rotation of the entire body of which is prevented by a collar-shaped baffle 33. The lower section of the still containing the heating fluid is separated from the remainder by a circular baffle 34. The section of the still thus isolated is evacuated by conduit 35 connecting with high vacuum pumps (not shown). A conduit 37 serves to introduce material to be distilled onto the upper central portion of plate 22. Annular-shaped projections 38 and 39 are positioned on the surface of plate 22 as shown.

Figure 2:
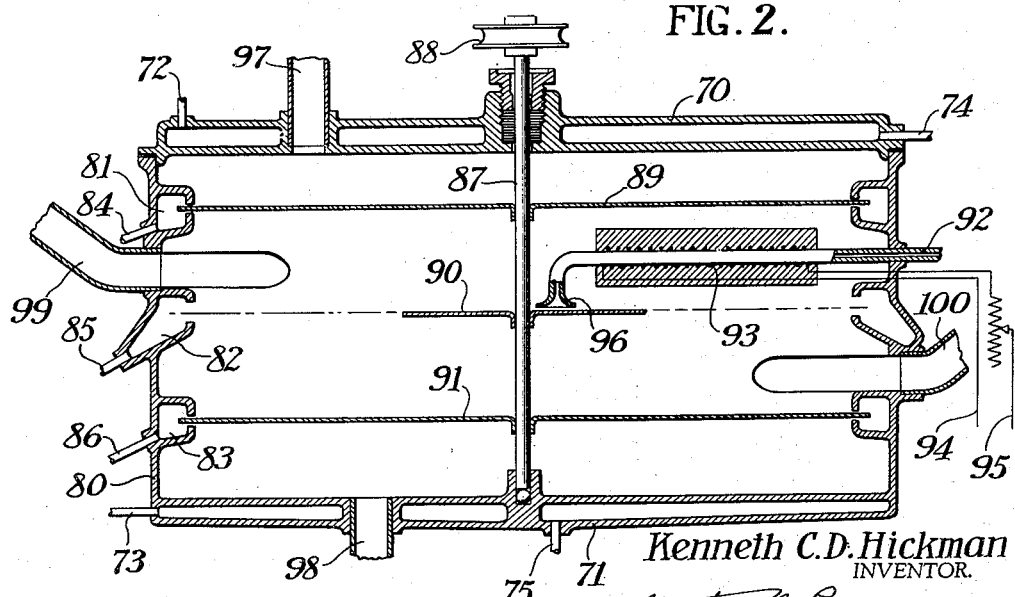
Fig. 2 illustrates an elevation in section of a modification of the type of still of Fig. 1.

Referring to Fig. 2, reference numeral 80 designates a cylindrical or drum-shaped still casing, the internal walls of which are provided with annular gutters 81, 82 and 83, draining into conduits 84, 85 and 86, respectively. A shaft 87 provided with a driving pulley 88 is vertically positioned in the still as shown and has mounted upon it disks 89, 90 and 91. These disks are spaced on shaft 87 in such a manner that their peripheries are on a horizontal plane with the openings of gutters 81, 82 and 83, respectively. Disks 89 and 91 are of such diameter that their periphery approaches or extends into the openings of the gutters. Disk 90 is of considerably less diameter. A capillary conduit 92 extends into the still and is provided with an electrical heating unit 93 which is heated by electricity introduced through lead wires 94 and 95, the latter being provided with a rheostat or similar means for controlling the current input. Conduit 92 is bent at right angles and the end 96 is flared and extends into close proximity with the upper surface of disk 90. The still is evacuated by means of high vacuum pumps connected to conduits 97, 98, 99 and 100. Conduits 99 and 100 being fan shaped as shown in order to provide a larger portal for diffusing gases.

Figure 3:
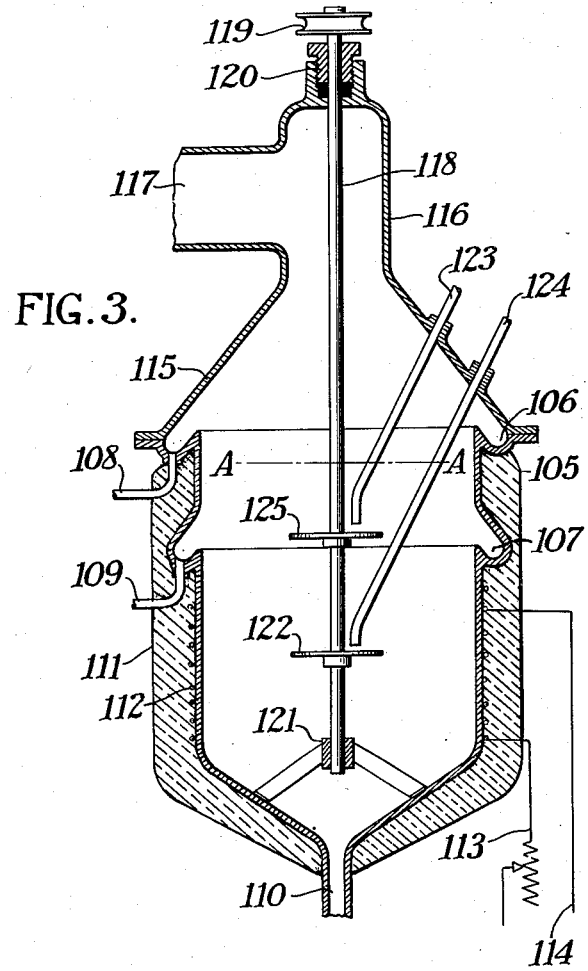
Fig. 3 is a sectional elevation of a vacuum still in which hot vapors are employed as a heating medium in direct contact with the material treated.

Referring to Fig. 3, reference numeral 105 designates a still casing in the walls of which are formed annular gutters 106 and 107 draining into conduits 108 and 109, respectively. The base of the casing 105 is cone-shaped as illustrated and drains into conduit 110. The lower portion of the still is provided with an insulated packing 111 within which is disposed a heating unit 112, heated by current delivered through leads 113 and 114. The upper portion of casing 105 is formed of a cone-shaped upper portion 115 and cylindrical portion 116 communicating with conduit 17. A shaft 118 provided with pulley 119 extends the length of the still and is mounted in bearings 120 and 121, bearing 120 being so constructed as to avoid admission of gas. A disk-shaped plate 125 is mounted upon shaft 119 in a plane horizontal with the central portion of gutter 107. A similar disk-shaped plate 122 is mounted upon shaft 118 at a lower point in the manner illustrated. Conduit 123 terminates just above the central portion of plate 125 and serves to introduce material to be distilled onto its upper surface. Conduit 124 located in a similar manner serves to introduce heating fluid onto the upper surface of plate 122.

In operating the apparatus illustrated in Fig. 1, the heating fluid 32 is brought to an elevated temperature by application of external heating means such as electrical resistance coils or gas burners. The still is evacuated through conduits 5 and 35. When a high vacuum has been produced, shaft 12 is caused to rotate at a high speed usually above 1000 R. P. M. The hot fluid 32 is drawn up the surface of plate 28 by centrifugal force and fills the space between plate 28 and plate 29. It is returned through the space formed between plates 26 and 28. In this manner the rotation of the entire assembly is caused to heat plate 24 to any desired distillation temperature. Material to be distilled and preferably in a degassed condition is introduced through conduit 37 on to the upper rotating surface of cone-shaped disk 22. The material is thrown by centrifugal force to the periphery of disk 22 and is shot into annular gutter 6. The material drains into conduit 11 and is conveyed to the central portion of plate 24. On falling onto the upper surface of plate 24 the liquid is shot by centrifugal force to the periphery and into gutter 8. The temperature of plate 24 is so regulated that the desired amount of distillation takes place during the short period of travel over its surface, complete distillation in the short time being a result of the extreme thinness of the film and/or high degree of turbulence. Molecules distilling from the surface of 24 travel to the surface of cone-shaped disk 22. The condensate is thrown by centrifugal force to the projection 39 and is shot into collar-shaped disk 30 and travels upon the surface thereof and is thrown into gutter 7 and withdrawn through conduit 9. Small amounts of condensate which are not thrown from the disk at 39 are eliminated at projection 38 and are likewise thrown into gutter 7. By introducing the material to be distilled onto the upper surface of disk 22 the distilland is caused to maintain the condensing surface at a suitable low temperature. Since convection of heat in a high vacuum is very low this troublesome difficulty of cooling is overcome in a simple manner. The false roof 36 formed of a disk-shaped plate rigidly mounted on shaft 12 serves to throw any condensate dripping from the walls and top of the still onto the horizontal walls of the still casing down which it flows into gutter 6.

In operation employing the apparatus of Fig. 2, the vacuum pumps connected to conduits 97, 98, 99 and 100 are put into operation and a vacuum of the proper value produced and maintained in the still. Shaft 87 is caused to rotate at a suitable high rate and heating unit 93 is brought to a suitable elevated temperature. Material to be distilled is forced through tube 92 and is sprayed in heated condition on the upper surface of disk 90 by the flared distributing head 96. The heated distilland is shot by centrifugal force in the form of a curtain or sheet of droplets into gutter 82. The dotted lines indicating the path of travel. Material evaporating from the sheet or curtain is condensed on plates 89 and 91. The condensate is thrown by centrifugal force into gutters 81 and 83 and is withdrawn through conduits 84 and 86. The upper surface of condensing plate 89 and the lower surface of condensing plate 91 are blackened in order to increase radiation and thus help to maintain the disks at a suitable condensing temperature. This heat is dissipated by radiation to the top 70 and base 71 of the still which are jacketed as shown for the circulation of cooling fluid by introduction through conduits 72 and 73 and withdrawal through conduits 74 and 75. If desired, these disks can be cooled by a cooling fluid in the manner described in connection with Fig. 1. The material to be distilled is introduced through the capillary tube 92 in such a way that it is raised to distillation temperature during its path of travel through the heating element 93. The heater 93 is at such a temperature that with the particular rate selected the material is brought to distillation temperature. The length of the capillary tube, the diameter and the rate of flow can all be adjusted to give practically instantaneous heating to distillation temperature and the material can then be immediately disposed on the plate 90, the heating and distillation taking place if desired in less than a small fraction of a second.

In operating the apparatus of Fig. 3, the still is evacuated through conduit 117. Shaft 119 is caused to rotate at a suitable high speed and heating unit 112 is brought to a suitable elevated temperature. A material having a lower vapor pressure than the desired distillate is introduced through conduit 124 onto the upper surface of rotating disk 122 and is thrown by centrifugal force against the heated walls of still casing 105. The material is thus vaporized and by suitable selection of temperature is heated to form a body of vapors extending above disk 121 as illustrated by the dotted line A—A. Material to be distilled is introduced through conduit 123 onto the upper surface of rotating disk 125 and is thrown by centrifugal force in the form of a spray of finely divided particles or thin sheet into the body of vapors of the heating fluid. The heating vapors condense upon the particles of distilland and their latent heat of vaporization is thus immediately imparted to the particles and volatile materials vaporized. The vapors travel to the air cooled condensing surface 115 where they are condensed and flow into gutter 106 and can be withdrawn through conduit 108. Material surviving the path of travel through the hot vapors is caught in gutter 107 and withdrawn through conduit 109. Condensed heating fluid and undistilled residues are withdrawn through 110. Due to condensation of heating fluid on the particles of distilland, the space between the spray of particles and the condenser is substantially free of heating vapors.

In using this apparatus to distill vitamins from fish oils, the body of the fish oil itself may be used as the heating fluid. Preheated fish oil may be introduced through 124 and a body of the glyceride vapors established in the still. Fresh fish oil is introduced through conduit 123 and the vitamins are distilled and condensed as described. Undistilled glycerides are withdrawn through 110 and portions of these are circulated as a heating fluid. In this manner the material distilled is caused to form its own heating vapor. On the other hand, any material having a lower vapor pressure than the material which is to be separated as a distillate can be used as the heating vapor. Examples of such materials are glycerides, such as whole vegetable and animal oils or non-volatile fractions thereof, hydrocarbons, high molecule weight fatty acids and esters thereof, etc.

The heating fluid employed in the heating and cooling fluids used in the apparatus of Figs. 1 and 2 must have a sufficiently low vapor pressure at the temperature at which they are used that they will not give off vapors and thus destroy the vacuum in the still or pollute the distillate and distilland. The selection of materials for this purpose obviously depends upon the vacuum used and the temperature which they have during their passage through the still. For high vacuum work, such as for instance at pressures below .1 of a mm., materials such as vegetable and animal oils, non-volatile hydrocarbon fractions, phthalate esters, etc., have been found to be very suitable. Speeds of rotation may be varied greatly depending upon the size of the apparatus and the material distilled. For most purposes speeds of 500 to 10,000 R. P. M. will be found to be suitable.

Many changes can be made in the above described apparatus without departing from the spirit or scope of my invention. For instance, it is possible to employ any number of condensing and evaporating disks in one still unit and such procedure would usually be preferable in large commercial installations. In the apparatus of Fig. 2, heating may be brought about by heating the disk 90 instead of preheating the material before introduction on the disk. In this manner the short space of time elapsing between the heating and actual distillation is eliminated. It is, of course, apparent that many stills can be connected in series and different fractions removed in each still or, if desired, incomplete distillation in one still can be made complete in a subsequent still when it is at substantially the same temperature.

The principles of my invention are applicable to processes of high vacuum, short path distillation in general. By high vacuum is meant any pressure below approximately .1 mm. such as for instance, .01 mm. to .0001 mm. Short path distillation is that type of distillation where the condensing and evaporating surfaces are close together and a free, unobstructed path for the travel of vapors from one surface to another is provided. When the pressure is sufficiently low and the distance of separation is less than about the mean free path the distillation will be a variety of short path distillation known as molecular distillation. The principles of this type of distillation are clearly set forth in my U. S. Patents 1,925,559 and 1,942,858 and also in a publication by Washburn, "Bur. St. Jour. Res." 2 (1929) 476-483. Due to difficulty in maintaining a very high vacuum it has been found that pressures of about .005 to .001 mm. are most economical for molecular or pseudo molecular distillation, i. e. where the conditions closely approach, but are not actually molecular. Distances of less than 12 inches and especially less than 6 inches such as ½ to 3 inches give best results in all of the above types of short path distillation.

Temperatures to be used vary according to the material to be distilled and the amount of impurities present. With vitamins temperatures between 70° and 300° C. can be used although those between 100° and 250° C. are most generally employed.

While my invention is of particular value in distilling vitamins from vegetable and animal oils such as cod and halibut liver, tuna, menhaden, etc. fish oils, it is applicable to the distillation of difficultly volatilizable, heat labil organic compounds in general. Thus it may be employed to distill hormones, sterols, sterol derivatives, enzymes, highly unsaturated glycerides, etc. which are easily decomposed by heating to an elevated temperature. Normally solid materials can be distilled by melting or by dissolving in a low vapor pressure liquid solvent in the manner described in my co-pending application 64,178 filed February 15, 1936.

I have found when distilling under molecular conditions, that for every elevation in temperature of about 10° C. the distillation rate is doubled. It has been impossible to take advantage of this discovery using prior known distillation methods, because using a higher temperature would greatly increase the rate of decomposition. However by operating in accordance with my invention these higher temperatures can be used without increasing decomposition. This result being due to the practically instantaneous vaporization which results by operating in the manner described. My discovery in fact makes it possible to distill materials at temperatures above what has previously been considered to be their decomposition temperature. Most decomposition temperatures have been determined by static methods which involved heating a body of the material over a space of time. However this value is entitled to consideration in most cases only if the period of heating is also given. If the heating period were less than a minute, to a fraction of a second as it is in my process, the value would have been found to be much higher. The heating periods described herein are intended to define the time of heating, i. e. the interval between the time that the distilland is fed onto the distilling surface and the time that the undistilled residue leaves the edge thereof.

Non-volatile, easily decomposable substances which could not be distilled without decomposition can be separated with ease employing the principles of my invention. For instance it has not been commercially feasible or possible to separate the high boiling form of vitamin D (disclosed in my copending application Serial No. 99,631, filed September 5, 1936) from fish oils by conventional methods of molecular distillation. This is due to its high boiling point and extreme thermal instability. In order to separate the material without undue decomposition it is necessary to have a heating period of less than 15-30 seconds at 240°-220° C. Distillation within this short period with commercial gravity flow methods is impossible. However by operating as described above distillation can be effected with ease in that length of time and in many cases in a second or less where the expedient of high temperature distillation is used.

What I claim is:

1. The process of concentrating a fat soluble vitamin contained in a vegetable or animal oil without substantial loss due to thermal decomposition which process comprises heating a thin film of the oil to distilling temperature by causing it to flow by centrifugal force over a heated vaporizing surface, the centrifugal force applied being sufficient to form a film of such extreme thinness that distillation of the vitamin occurs in less than approximately one minute, condensing the vitamin vapors upon a rotating condensing surface which is rotated at a speed sufficient to cause the condensate to pass by centrifugal force to the edges thereof, which condensing surface is located at a distance from the film of less than approximately the mean free path of residual gas and which is separated from the film by substantially unobstructed space and maintaining a reduced pressure of less than .1 mm. in the space between the film and the condensing surface.

2. The process of concentrating a fat soluble vitamin contained in a vegetable or animal oil without substantial loss due to thermal decomposition which process comprises subjecting the oil to high vacuum, short path distillation by heating a thin film of the oil to distilling temperature by causing it to flow by centrifugal force over a heated vaporizing surface, the centrifugal force applied being sufficient to form a film of such extreme thinness that distillation of the vitamin occurs in less than approximately one minute, condensing the vitamin vapors upon a condensing surface located inside the still and at a distance from the film of less than approximately the mean free path of the molecules of residual gas and separated therefrom by substantially unobstructed space and maintaining a reduced pressure of less than .1 mm. in the space between the film and the condensing surface.

3. The process of concentrating a fat soluble vitamin contained in a vegetable or animal oil without substantial loss due to thermal decomposition which process comprises subjecting the oil to high vacuum, short path distillation by depositing the oil onto a heated rapidly rotating surface over which it is caused to flow as a film of extreme thinness by centrifugal force, condensing vitamin vapors thus generated upon a condensing surface located inside the still and at a short distance from the rotating surface and separated therefrom by substantially unobstructed space and maintaining a pressure of less than approximately .1 mm. in the space between the rotating surface and the condensing surface.

4. The process of removing and recovering complex, difficultly volatilizable, thermally unstable organic compounds from an organic oil which process comprises subjecting the oil to high vacuum, short path distillation by heating a thin film of the oil to distilling temperature by causing it to flow by centrifugal force over a heated vaporizing surface, the centrifugal force applied being sufficient to form a film of such extreme thinness that distillation of the complex unstable organic compound occurs in less than approximately one minute, condensing the vapors upon a condensing surface located inside the still and at a short distance from the film and separated therefrom by substantially unobstructed space and maintaining a reduced pressure of less than approximately .1 mm. in the space between the film and the condensing surface.

5. The process of removing and recovering complex, difficultly volatilizable, thermally unstable organic compounds from an organic oil which process comprises subjecting the oil to high vacuum, short path distillation by depositing the oil liquid onto a heated, rapidly rotating surface over which it is caused to flow as a film of extreme thinness by centrifugal force, condensing vapors thus generated upon a rotating condensing surface which is rotated at a speed sufficient to cause the condensate to pass by centrifugal force to the edges thereof, which condensing surface is located inside the still and at a short distance from the film and is separated therefrom by substantially unobstructed space and maintaining a pressure of less than approximately .1 mm. in the space between the rotating vaporizing and condensing surfaces.

6. The process of removing and recovering complex, difficultly volatilizable, thermally unstable organic compounds from an organic vegetable or animal oil which process comprises subjecting the oil to high vacuum, short path distillation by depositing the oil onto a heated, rapidly rotating surface over which it is caused to flow as a film of extreme thinness by centrifugal force, condensing vapors thus generated upon a condensing surface located within the still and separated from the rotating surface by substantially unobstructed space and maintaining a pressure of less than approximately .1 mm. in the space between the rotating surface and the condensing surface.

7. The process of removing and recovering complex, difficultly volatilizable, thermally unstable organic compounds from an organic liquid which contains them, which process comprises subjecting it to high vacuum, short path distillation by causing the organic liquid to flow over a moving heated vaporizing surface by centrifugal force in a substantially thinner film than would result if it were permitted to flow down a smooth vertical vaporizing surface by gravity, condensing vapors upon a condensing surface located within the still and separated from the film by substantially unobstructed space and maintaining a high vacuum in the space between the film and the condensing surface.

KENNETH C. D. HICKMAN.